United States Patent
Tomite et al.

(10) Patent No.: US 8,933,965 B2
(45) Date of Patent: Jan. 13, 2015

(54) METHOD FOR CALCULATING LIGHT SOURCE INFORMATION AND GENERATING IMAGES COMBINING REAL AND VIRTUAL IMAGES

(75) Inventors: Kaname Tomite, Tokyo (JP); Toshikazu Ohshima, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 1505 days.

(21) Appl. No.: 11/781,873

(22) Filed: Jul. 23, 2007

(65) Prior Publication Data

US 2008/0024523 A1    Jan. 31, 2008

(30) Foreign Application Priority Data

Jul. 27, 2006  (JP) ................................. 2006-204845

(51) Int. Cl.
*G06T 15/50* (2011.01)
*G06T 15/60* (2006.01)
*G06T 19/00* (2011.01)

(52) U.S. Cl.
CPC ................ *G06T 15/50* (2013.01); *G06T 15/60* (2013.01); *G06T 19/006* (2013.01)
USPC ........................................................ 345/633

(58) Field of Classification Search
CPC .............. G06T 19/006; G06T 15/60
USPC ............................................... 345/632, 633
See application file for complete search history.

(56) References Cited

U.S. PATENT DOCUMENTS

| | | | | |
|---|---|---|---|---|
| 6,930,685 | B1 * | 8/2005 | Sakagawa et al. | 345/426 |
| 6,980,697 | B1 * | 12/2005 | Basso et al. | 382/274 |
| 2002/0152478 | A1 * | 10/2002 | Stauder et al. | 725/143 |

FOREIGN PATENT DOCUMENTS

JP    2000-251060 A    9/2000

OTHER PUBLICATIONS

Sato, Y. Sato, and K. Ikeuchi, "Acquiring a radiance distribution to superimpose virtual objects onto a real scene", IEEE Transactions on Visualization and Computer Graphics, vol. 5 No. 1, pp. 1-10, Mar. 1999.

M. Kanbara, T. Iwao, and N.Yokoya, "Shadow Representation for Augmented Reality by Dynamic Shadow Map Method", a lecture for an image recognition and comprehension symposium (MIRU2005), pp. 297-304, Jul. 2005.

(Continued)

*Primary Examiner* — Jeffery A Brier
(74) *Attorney, Agent, or Firm* — Canon USA Inc. IP Division

(57) ABSTRACT

A method for combining a real space image with a virtual image, includes: causing an imaging unit to capture an image of a real space; generating an image covering a predetermined space based on a plurality of real images in the captured real space; extracting position information of a light source based on the generated image; and adding a light source or a shadow on the virtual image based on the extracted position information of the light source.

23 Claims, 7 Drawing Sheets

(56) References Cited

OTHER PUBLICATIONS

Paul E. Debevec, Rendering Synthetic Objects into Real Scenes: Bridging Traditional and Image-Based Graphics with Global Illumination and High Dynamic Range Photography, SIGGRAPH98, Jul. 1998, pp. 1-10.

Kanbara M et al: "A stereoscopic video see-through augmented reality system based on real-time vision-based registration" Virtual Reality Proceedings. IEEE, pp. 255-262, XP010378991, Mar. 2000.

Schmalstieg D., et al: "The Studierstube Augmented Reality Project" Retrieved from the Internet: <URL:http://www.ims.tuwien.ac.at/media/documents/publications/schmalstieg_studierstube.pdf> pp. 33-54, Dec. 2002.

Mitsumine et al., "Imaging Composting System using Omni-Directional Illumination", Journal of the Institute of Image Information and Television Engineers, 2005, pp. 1059-1066, vol. 59, No. 7, Japan.

Masayuki et al.,"Augmented Reality Considering the Environment of Illumination in the Real World", 2003, pp. 43-47.

* cited by examiner

METHOD FOR CALCULATING LIGHT SOURCE INFORMATION AND GENERATING IMAGES COMBINING REAL AND VIRTUAL IMAGES

BACKGROUND OF THE INVENTION

1. Field of the Invention

The present invention relates to methods, apparatuses and programs for generating images combining real images and virtual images such as computer graphics images (CG images).

2. Description of the Related Art

A so-called mixed reality (MR) technique provides mixed reality including a CG image combined with a real space image (i.e., a background), according to which a user can feel as if a virtual object is present in the real space. The MR technique can be used in the fields of communication, traffic, recreation, and other various industries.

To smooth the processing for combining a virtual space with the real space and prevent a user from experiencing any sense of incongruity, the following consistencies are desirable in the MR technology:
(1) geometrical consistency for mixing an object of the real space with an object of the virtual space while maintaining a correct spatial relationship;
(2) optical consistency for naturally mixing a light source of the real space with a light source of the virtual space; and
(3) temporal consistency for equalizing the time of the real space with the time of the virtual space.

To achieve these consistencies, it is important to correctly recognize the information and state of the real space and accurately input the information of the real space to the virtual space.

Various systems have been conventionally proposed to solve the optical consistency (i.e., one of the above-described consistencies).

The system discussed in literature 1 (I. Sato, y. Sato, and K. Ikeuchi, "Acquiring a radiance distribution to superimpose virtual objects onto a real scene," IEEE Transactions on Visualization and Computer Graphics, Vol. 5, No. 1, PP. 1-12, January-March 1999) obtains an omni-directional image of a real space captured by a fish-eye camera, estimates position information of a light source in the real environment from the obtained omni-directional image, and reflects the estimated position information of the light source on a virtual space.

Furthermore, the system discussed in literature 2 (M. Kanbara, T. Iwao, and N. Yokoya, "Shadow Representation for Augmented Reality by Dynamic Shadow Map Method", a lecture memoir for an image recognition and comprehension symposium (MIRU2005), pp. 297-304, July 2005) realizes a real-time estimation of the light source environment (the positions of light sources of the real world) based on a three-dimensional marker which combines a two-dimensional square marker and a mirror ball placed on the center of the marker, and disposes virtual light sources based on the estimated positions.

According to the literature 2, the system calculates a relative position between a viewpoint and a virtual object based on the position and orientation of the two-dimensional square marker. Then, to estimate a light source environment, the system causes a camera mounted on a video see-through head mounted display (HMD) to capture a light source of the real environment reflected in the mirror ball (i.e., a highlight region of the mirror ball) based on the calculated relative position.

The system discussed in the literature 1 can obtain light source information of the real environment in a single image-capturing operation. However, the system cannot perform a real-time estimation of light source environment in response to a change in an illumination environment, and cannot reflect the change in the illumination environment on the virtual space.

The system discussed in the literature 2 performs a real-time estimation of light source information and can reflect the estimation result on the virtual environment. However, a user is required to constantly capture the two-dimensional marker in a field of view and is also required to prepare a complicated marker (i.e., a two-dimensional marker including the two-dimensional marker and mirror ball) beforehand.

SUMMARY OF THE INVENTION

It is desirable to generate a combined image of a real space image and a virtual image in response to a change in the environment light source, without using a special apparatus such as a three-dimensional marker including a mirror ball.

An aspect of the present invention provides a method of presenting a combined image in which an image of a real space is combined with a virtual image of a virtual object. The method includes: receiving image data for a plurality of captured images, the plurality of captured images including images relating to different respective parts of the real space; generating modeling image data, representing an image covering at least a predetermined portion of the real space, based on the received image data for the plurality of captured images; estimating light source information relating to the real space based on the modeling image data; generating virtual image data, representing the virtual image, including managing light source information relating to the virtual object based on the estimated light source information relating to the real space; and updating the modeling image data following receipt of image data for a new captured image relating to such a part of the real space, and updating the estimated light source information relating to the real space based on the updated modeling image data, and updating the light source information relating to the virtual object based on the updated light source information relating to the real space, and regenerating the virtual image data.

Another aspect of the present invention provides a program which, when executed by a computer or processor, causes the computer or processor to carry out a method embodying the aforesaid aspect of the invention. Still another aspect of the present invention provides an apparatus for generating a combined image in which an image of a real space is combined with an image of a virtual object.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the invention and, together with the description, serve to explain at least some of the principles of the invention.

DETAILED DESCRIPTION OF THE EMBODIMENTS

Figure 1:
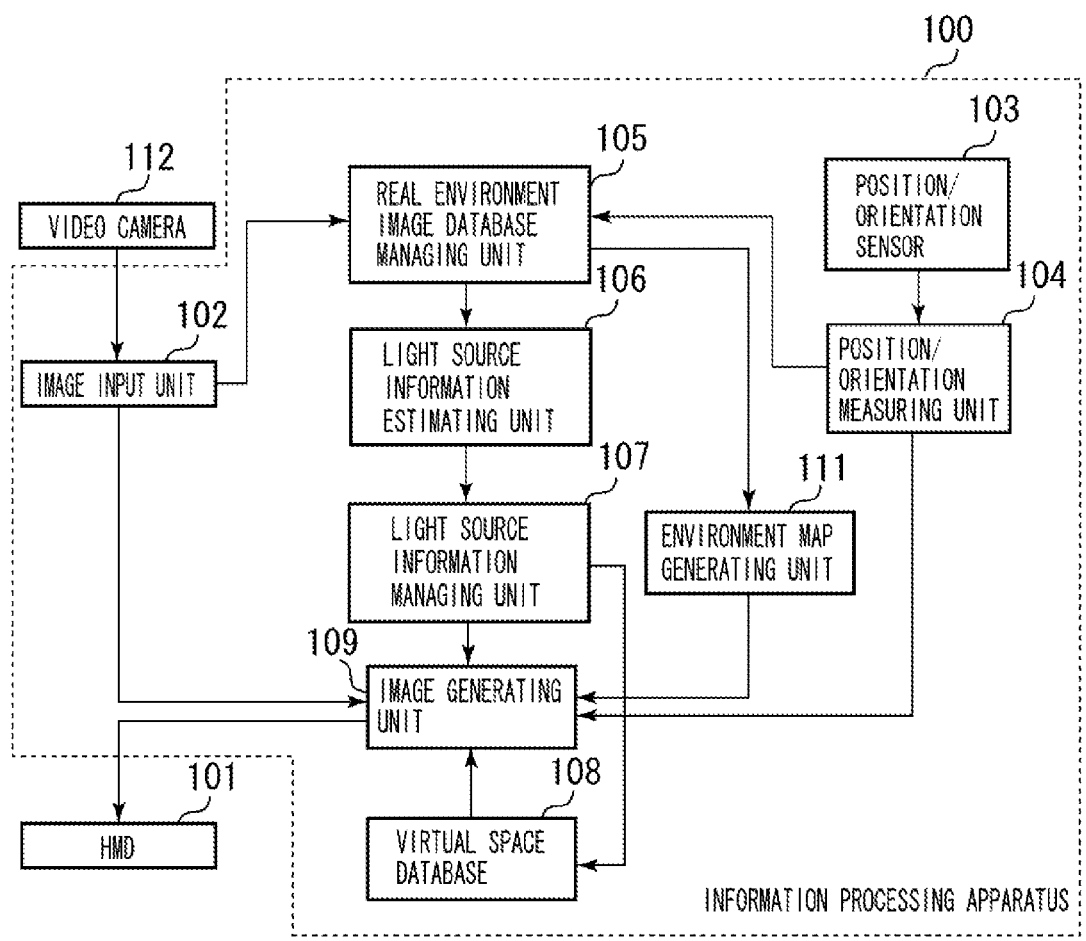
FIG. 1 is a block diagram illustrating an information processing apparatus according to a first exemplary embodiment.

The following description of exemplary embodiments is merely illustrative in nature and is in no way intended to limit the invention, its application, or uses.

Processes, techniques, apparatuses, and systems as known by one of ordinary skill in the art are intended to be part of the enabling description where appropriate. For example, certain circuitry for image processing, data processing, and other uses may not be discussed in detail. However these systems and the methods to fabricate these systems as known by one of ordinary skill in the relevant art are intended to be part of the enabling disclosure herein where appropriate.

It is noted that throughout the specification, similar reference numerals and letters refer to similar items in the following figures, and thus once an item is described in one figure, it may not be discussed for following figures.

Exemplary embodiments will be described in detail below with reference to the drawings.

First Exemplary Embodiment

Figure 2:
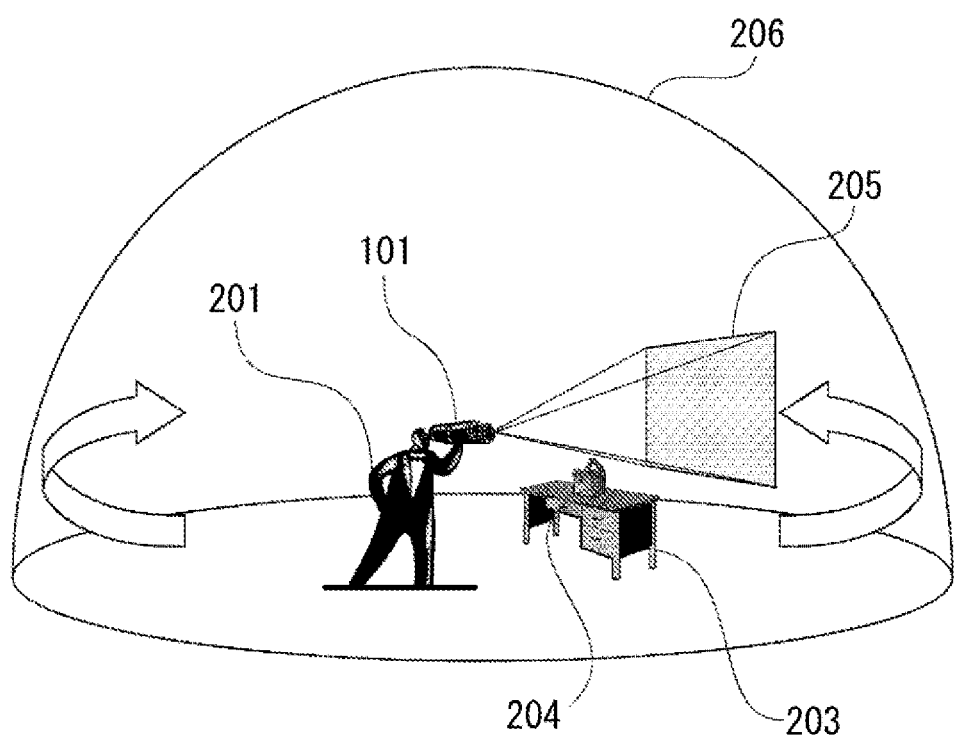
FIG. 2 illustrates the concept of the information processing apparatus according to the first exemplary embodiment.

FIG. 1 is a block diagram illustrating an information processing apparatus 100 according to a first exemplary embodiment of the present invention. FIG. 2 is a conceptual illustration of the mixed reality that the information processing apparatus 100 can provide.

In FIG. 2, a head mounted display (hereinafter, referred to as HMD) 101, carried by a user 201, includes a video camera capable of obtaining position and orientation data. The user 201 can observe a real space through a video image (real image) 205 captured by the video camera. In FIG. 2, the information processing apparatus 100 can generate a virtual image of a celestial sphere 206 by connecting together (e.g., stitching) a plurality of real space images (real images) 205 captured by the video camera. Each captured image 205 is an image of the real space captured by the video camera. The celestial sphere 206 is a hemisphere having an infinite radius and can be regarded as a screen on which the captured image 205 can be projected.

In the present exemplary embodiment, the information processing apparatus 100 estimates light source information of the real space based on the generated celestial sphere image. The information processing apparatus 100 generates a virtual object 204 having natural brightness and shadow based on the estimated light source information.

The information processing apparatus 100 combines the virtual object 204 having the brightness and shadow being set as described above with a real image of a desk 203 (i.e., a real object) captured by the video camera of the user 201.

The HMD 101 receives a combined image of the virtual object 204 and the real object 203 generated by the information processing apparatus 100 and displays the combined image on its display unit so that the user 201 can view the combined image. As a virtual object in the displayed combined image has natural brightness and shadow, the user 201 can experience the mixed reality without having any sense of incongruity.

The information processing apparatus 100 illustrated in FIG. 1 includes various units having the following functionalities. In FIG. 1, the information processing apparatus 100 is connected to a video camera 112 capturing an image of the real space and also connected to the HMD 101.

According to the exemplary arrangement of FIG. 1, the video camera 112 and the HMD 101 are separated from each other. However, it is useful to incorporate the video camera 112 in the HMD 101, for example, if the video camera 112 includes a right-eye camera and a left-eye camera positioned closely to both eyes of the user 201 so that each camera is fixed along the line-of-sight of the user 201. Furthermore, instead of using the right-eye camera and the left-eye camera, it is possible to use a monocular video camera or attach a video camera to a hand held display (HHD) which the user 201 can hold in his/her hand.

In the present exemplary embodiment, the HMD 101 includes a right-eye compact display unit and a left-eye compact display unit. Each display unit can display a combined image of the real space image captured by the video camera 112 and a virtual image (i.e., an image of the virtual object 204) generated by the information processing apparatus 100. Thus, the user 201 can observe an image of the real space combined with the virtual object.

To simplify the description, the following is the processing applied to a single image although it may be applied to a pair of images captured by a right-eye video camera and a left-eye video camera.

When a pair of video cameras (compound eye camera) is used, the information processing apparatus 100 applies similar processing to each image captured by the video cameras and generates a pair of combined images. The right-eye display unit and the left-eye display unit incorporated in the HMD can independently display a corresponding one of the generated pair of combined images.

An image input unit 102 obtains a real image captured by the video camera 112. The image input unit 102 converts an image signal captured by the video camera 112 into digital image data. The image input unit 102 is, for example, a video capture board configured to convert the image signal into digital image data.

A position/orientation sensor 103 can detect the position and orientation of the video camera 112. The position/orientation sensor 103 is, for example, a gyro sensor. A position/orientation measuring unit 104 obtains a real-time output of the position/orientation sensor 103. The position/orientation measuring unit 104 calculates three-dimensional position and orientation data of the video camera 112.

A real environment image database managing unit 105 receives image data supplied from the image input unit 102 and three-dimensional position and orientation data of the video camera 112 supplied from the position/orientation measuring unit 104. The real environment image database managing unit 105 generates a celestial sphere image based on the input data and holds the generated celestial sphere image. The real environment image database managing unit 105 includes, for example, a hard disk which can record data.

An exemplary method for generating a celestial sphere image is described below with reference to FIG. 2. As illustrated in FIG. 2, the celestial sphere 206 forms part of a virtual space where the user 201 can experience the mixed reality. Initially, the celestial sphere 206 has a neutral gray color. In the present exemplary embodiment, the virtual setting is created by storing a pair of data (coordinate values of positions on the celestial sphere, in the coordinate system defining the virtual space, and color information) into a storage apparatus.

The celestial sphere image generation method includes successively obtaining, through the image input unit 102, the image 205 captured by the video camera 112 carried by the user 201 who looks around with the camera 112. Furthermore, the method includes successively projecting the image 205 on the celestial sphere 206 based on the position and orientation of the video camera 112, as illustrated in FIG. 2.

In this manner, by mapping the projected images 205 on the celestial sphere 206, the portions of the celestial sphere 206 that were initially undefined (i.e., a neutral gray portion) can be successively replaced with the corresponding projected images 205 so that a complete celestial sphere image can be finally formed on the celestial sphere 206. The celestial sphere image generated through the above-described processing can be registered in the real environment image database managing unit 105, and can be updated.

Furthermore, in a case where modeling for preliminarily determining the shape and layout of walls and objects in the real space is available, the celestial sphere image generation method may include mapping the captured image 205 on such a modeling shape without using the above-described celestial sphere. The modeling shape is, for example, a rectangular parallelepiped resembling a room. Similar to a celestial sphere image, the captured image 205 being mapped on the modeling shape can be registered in the real environment image database managing unit 105, and can be updated.

Various stitching techniques are usable for naturally connecting the captured images in the process of generating a panoramic image. Accordingly, using one of these stitching techniques enables the apparatus to generate a celestial sphere image having a substantially seamless boundary between the captured images. Furthermore, using the substantially seamless celestial sphere image enables the apparatus to improve the accuracy for detecting a light source position and can appropriately estimate a light source.

A light source information estimating unit 106 estimates light source information in the real space based on the celestial sphere image held in the real environment image database managing unit 105 and the three-dimensional position and orientation data of the video camera 112. In general, light source information in the computer graphics includes the type of light source as well as luminance, color, and position/orientation of the light source.

The type of light source is, for example, a parallel light source, a point light source, or a spotlight. For simplifying the description, the present exemplary embodiment uses a point light source because the point light source requires no calculation for detecting the orientation of a light source. Thus, the light source information estimating unit 106 estimates only a position of the light source in addition to the luminance and color of the light source.

Presently-available computer graphics technology is unable to handle an infinite number of light sources. Therefore, the light source information estimating unit 106 accesses the celestial sphere image registered in the real environment image database managing unit 105, and selects and extracts a limited number of light sources which may have significant influence.

There are various methods for estimating a light source using a generated celestial sphere image. The present exemplary embodiment uses a method for extracting a region having a luminance value higher than a predetermined threshold. An exemplary method for calculating the luminance, position, and color of a light source is described below.

Regarding the luminance of light source, the method includes successively extracting a predetermined number of regions having a luminance value higher than a predetermined threshold (i.e., highlight regions) from the celestial sphere image registered in the real environment image database managing unit 105, and setting a relative luminance value of a virtual light source for each region so that a sum of calculated luminance values becomes equal to a predetermined luminance value.

Regarding the color of light source, the method includes decomposing the image data registered in the real environment image database managing unit 105 into three primary (R, G, and B) color components, extracting pixel values in respective highlight regions, calculating an average value of R, G, and B color components for each region, and setting a color of the light source.

However, the video camera 112 incorporated in the HMD 101 constantly obtains a real environment. A displayed light source color may have a tint slightly different from the tint of a real light source color. In such a case, a user can edit the light source information during an operation of the system.

Next, regarding the position of light source, the method includes matching each point of a geodesic dome (i.e., a group of points disposed at equal intervals on the celestial sphere) with the celestial sphere image, and disposing a light source on a point of the geodesic dome which is closest to a point having a highest luminance value in the extracted highlight region.

Furthermore, there is a conventional method, such as image based lighting (IBL), in which each pixel of the celestial sphere is a point light source. Accordingly, as the light source layout method, an appropriate method can be selected depending on the system.

One example of the IBL method is discussed in detail in Paul E. Debevec, Rendering Synthetic Objects into Real Scenes: Bridging Traditional and Image-Based Graphics with Global Illumination and High Dynamic Range Photography, SIGGRAPH98, July 1998. Therefore, a detailed description about the IBL method is omitted.

The HMD 101 carried by the user 201 includes two video cameras that enable a user to view a stereoscopic image. Accordingly, the method may include performing a stereo measurement based on highlight information of images captured by respective video cameras and distance information between two video cameras, calculating three-dimensional information of a light source positioned in the real space, and disposing a virtual light source on the calculated position.

Although the light source of the present exemplary embodiment is a point light source, it may be useful to deal with other kinds of light source or edit the light source information based on a user's instruction.

An exemplary method for calculating the position and orientation of another kind of light source is described below. In the case of a parallel light source, the method includes placing a simple rod-like object in the real space, extracting a shadow of the object, and calculating a position and orientation of the light source based on the extracted shadow.

Furthermore, to reproduce a fluorescent lamp or a similar light source, the method includes setting a line (or surface) light source, disposing point light sources on edge points and the center (or centroid) of the line (or surface) light source, and simulating the line (or surface) light source using the point light sources.

A virtual space database 108 stores CG model data of a three-dimensional virtual object to be presented to the user 201. A light source information managing unit 107 manages light source information (e.g., brightness and shadow) of the three-dimensional virtual object stored in the virtual space database 108, based on the light source information estimated by the light source information estimating unit 106. Furthermore, the user 201 can change the light source information registered in the virtual space database 108 by changing the light source information managed by the light source information managing unit 107.

An image generating unit 109 generates a combined image of a virtual object image to be observed by the user 201 (i.e., from the viewpoint position and orientation) and a real space image obtained by the image input unit 102. More specifically, the image generating unit 109 generates a virtual object image based on the position and orientation data calculated by the position/orientation measuring unit 104, geometric information of a virtual object included in the virtual space database 108, attribute information (color, texture, etc.), and estimated light source information. Any conventional technique is available to generate a three-dimensional virtual object image based on the light source information. Therefore, a detailed description about the technique is omitted.

The HMD 101 displays a combined image on a built-in display unit based on combined image data received from the image generating unit 109. When the combined image is displayed on the HMD 101, a user feels as if the virtual object 204 is placed on the desk 203 of the real space.

An environment map generating unit 111 generates an environment map that can impose dummy reflections onto the virtual object 204, using the image information obtained from the real environment image database managing unit 105. Any conventional method can be used to generate an environment map and apply the map to a virtual object. An exemplary method for generating an environment map is described below.

The method includes generating an environment map based on a rendered environment around an object. In the present exemplary embodiment, the environment map generating unit 111 performs the rendering based on the image supplied from the real environment image database managing unit 105.

The environment map generation method may include obtaining six (i.e., front, rear, upper, lower, left, and right) two-dimensional image planes to form a cube. Alternatively, the method may include placing a semi-spherical mirror ball opposing to the viewpoint in a virtual space and rendering omni-directional reflections of light into the semi-spherical ball to form a two-dimensional image.

The principle of the environment map causes reflection, during the rendering, by using a normal from a point at which a beam advancing along the line-of-sight hits an object and then replaces a color of a point where the reflected beam intersects with an environment map, with the color of the object. Using a virtual image resulting from the environment map is useful because a natural combined image can be provided to a user.

A general computer apparatus including a video capture board can realize the above-described arrangement except the video camera 112 and the HMD 101. Accordingly, at least part of the following processing of the information processing apparatus can be realized by a central processing unit (CPU) that can execute a control program stored in a memory.

Next, exemplary processing performed by the information processing apparatus according to the present exemplary embodiment is described with reference to the flowchart of FIG. 5.

First, in step S500, the CPU activates the system, obtains settings of the celestial sphere 206 (or any other suitable modeling shape of the real space), and performs initialization.

In the initialization, if there is an image group projected on the celestial sphere 206 or the modeling shape, the CPU deletes the image group and once daubs it over with a neutral gray color, and deletes the light source information registered in the virtual space database 108.

In step S501, the CPU obtains the position and orientation data of the video camera 112 from the position/orientation measuring unit 104. In step S502, the image input unit 102 obtains the real image data captured by the video camera 112.

In step S503, the CPU generates a projected image in a virtual environment surrounding the user 201 (i.e., projects the captured image onto the celestial sphere 206 or other model used to model the real environment) based on the image data and the position and orientation data of the video camera obtained in steps S501 and S502. The CPU registers the projected celestial sphere image in the real environment image database managing unit 105.

In this manner, the CPU can constantly update the real environment database so as to store newest real environment data by successively registering captured images into the database.

Accordingly, the present exemplary embodiment can establish the real environment database without using a special apparatus such as a two-dimensional marker including a mirror ball.

The position/orientation measuring unit 104 performs a real-time measurement of the position and orientation of the video camera 112 via the sensor 103. Therefore, the CPU can detect the line-of-sight direction in a situation where the captured image 205 is obtained. The CPU can project the captured image 205 on the celestial sphere 206 along the line-of-sight direction, with reference to a known angle of view of the camera.

In step S504, the CPU estimates light source information (e.g., position, tint, and luminance of light source) based on the real environment image database obtained in the processing of step S503. As the real environment image database is constantly updated, the CPU can estimate the light source information based on the updated real environment image database. Thus, a real-time illumination change of the real environment can be immediately reflected on the light source information of the virtual space.

In step S505, the CPU sets and changes the light source information registered in the virtual space database 108 based on the light source information estimated in step S504.

More specifically, the CPU can set and change the light source information by adding the light source information estimated in step S504 to the light source information registered in the virtual space database 108.

In step S506, the CPU generates a virtual image based on the position and orientation data of the video camera obtained in step S501, the light source information set in step S505, and the virtual object information registered in the virtual space database.

In step S507, the CPU combines the real image obtained in step S502 with the virtual image generated in step S506 and outputs a generated combined image to the HMD 101.

In step S508, the CPU determines whether the processing is completed. If the CPU determines that the processing is not completed (NO in step S508), the processing flow returns to step S501 and the CPU repeats the above-described processing of steps S501 through S507. For example, the CPU can determine in step S508 that processing is completed based on an instruction of a user who wants to finish the current MR session.

Furthermore, on the assumption that the light source environment does not change during the current MR session, the CPU can calculate a filling rate as a ratio of the image of the real environment image database managing unit 105 to a celestial sphere model or other three-dimensional shape model of the scene. Once the filling rate has reached 100% and the light source information has been estimated, the CPU can terminate the light source estimation processing.

Furthermore, the CPU can compare successively captured images with the images stored in the real environment image database managing unit 105. If a luminance value of the entire image has greatly changed, the CPU can determine that illumination conditions of the real space have changed and the CPU can restart the light source estimation processing.

The present exemplary embodiment uses measurement values of a sensor to measure or estimate the position and orientation of the video camera 112. However, the position/orientation measuring (or estimating) method according to the present exemplary embodiment is dependent on the system. Therefore, it may be useful to select a method using both a sensor and a two-dimensional marker or a method using only a two-dimensional marker.

Figure 3:
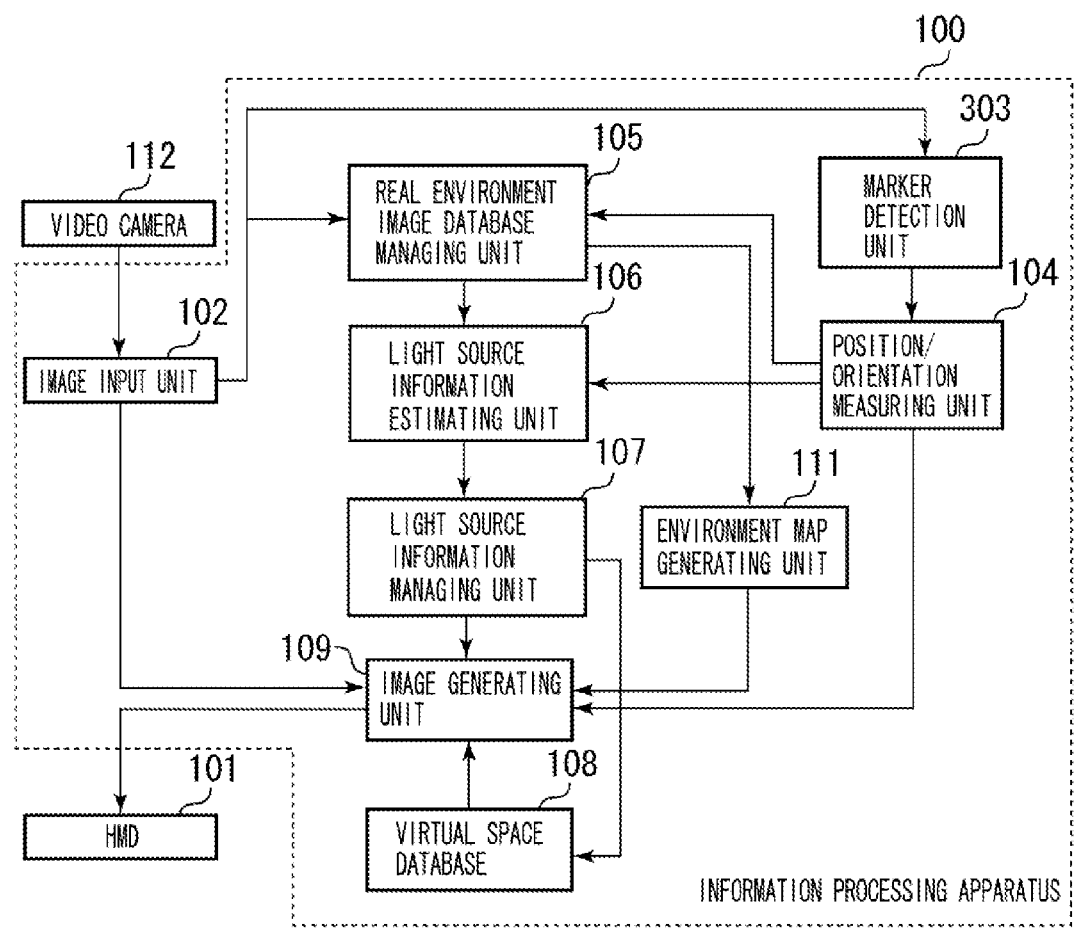
FIG. 3 is a block diagram illustrating a modified information processing apparatus according to the first exemplary embodiment, which employs a marker measurement instead of using a position/orientation sensor.
Figure 4:
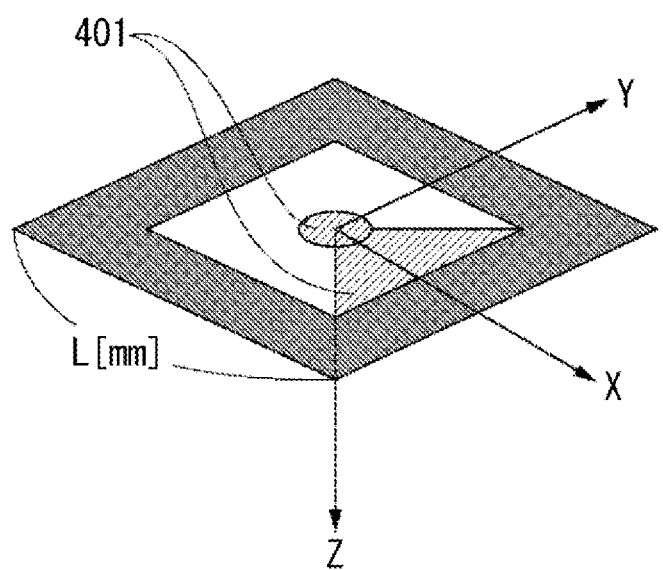
FIG. 4 illustrates a two-dimensional marker.

FIG. 3 illustrates an exemplary image processing apparatus using a two-dimensional marker. In FIG. 3, a marker detection unit 303 detects a two-dimensional marker 401 illustrated in FIG. 4 based on the image supplied from the image input unit 102. In FIG. 4, the two-dimensional marker 401 is a hatched region surrounded by a square frame having sides of length L mm. The hatched region is distinct from other markers and can be used to recognize the marker 401.

The two-dimensional marker 401 is a reference point having a known position in the real space and also having known distinguishing features (e.g., color, shape, and pattern) that are extractable from the captured image. Details of the marker are conventionally known, and therefore their description is omitted. Accordingly, the marker detection unit 303 detects the two-dimensional marker 401 by searching within the captured image for a region corresponding to the features of the two-dimensional marker 401 from the image.

As is conventionally known, the image processing apparatus can estimate the position and orientation of the two-dimensional marker based on the marker information (e.g., position, direction, and area of the marker 401 in the image) detected by the marker detection unit 303, the position of feature points of the marker 401 in the marker coordinate system, and camera parameters of the video camera 112.

Second Exemplary Embodiment

Figure 6:
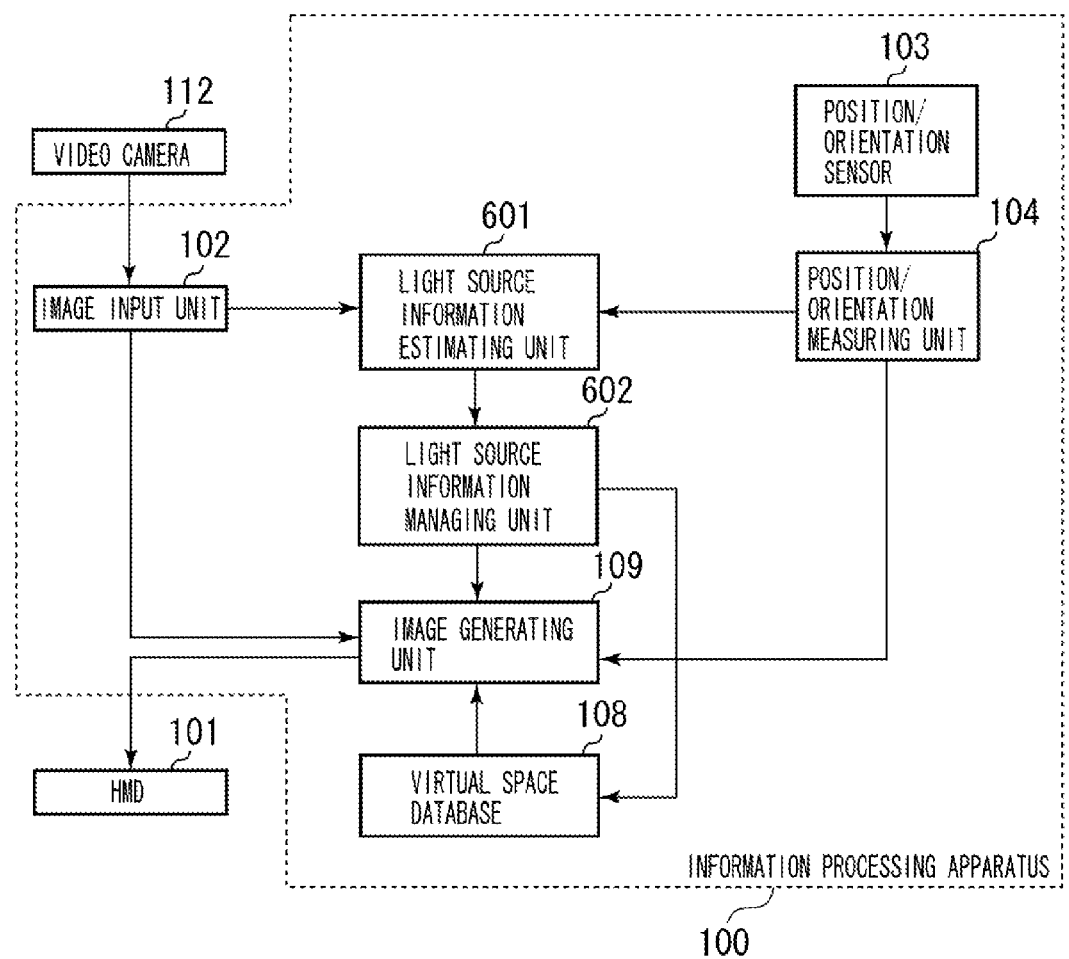
FIG. 6 is a block diagram illustrating an information processing apparatus according to a second exemplary embodiment.

FIG. 6 is a block diagram illustrating an information processing apparatus according to a second exemplary embodiment. The information processing apparatus illustrated in FIG. 6 includes a light source information estimating unit 601 and a light source information managing unit 602 which are not used in the information processing apparatus according to the first exemplary embodiment. The information processing apparatus illustrated in FIG. 6 does not include the real environment database managing unit 105.

The light source information estimating unit 601 estimates light source information relating to the line-of-sight direction of the video camera 112 based on the image data supplied from the image input unit 102 and three-dimensional position and orientation data of the video camera 112 supplied from the position/orientation measuring unit 104, without generating a celestial sphere image.

The light source information managing unit 602 integrates light source information estimated by the light source information estimating unit 601 and registers and sets the integrated information in the virtual space database 108. The light source information integration method, for example, includes successively selecting light sources having higher luminance values from the highlight regions extracted from the light source information, and discarding any light source having a luminance value equal to or less than a predetermined value.

Figure 5:
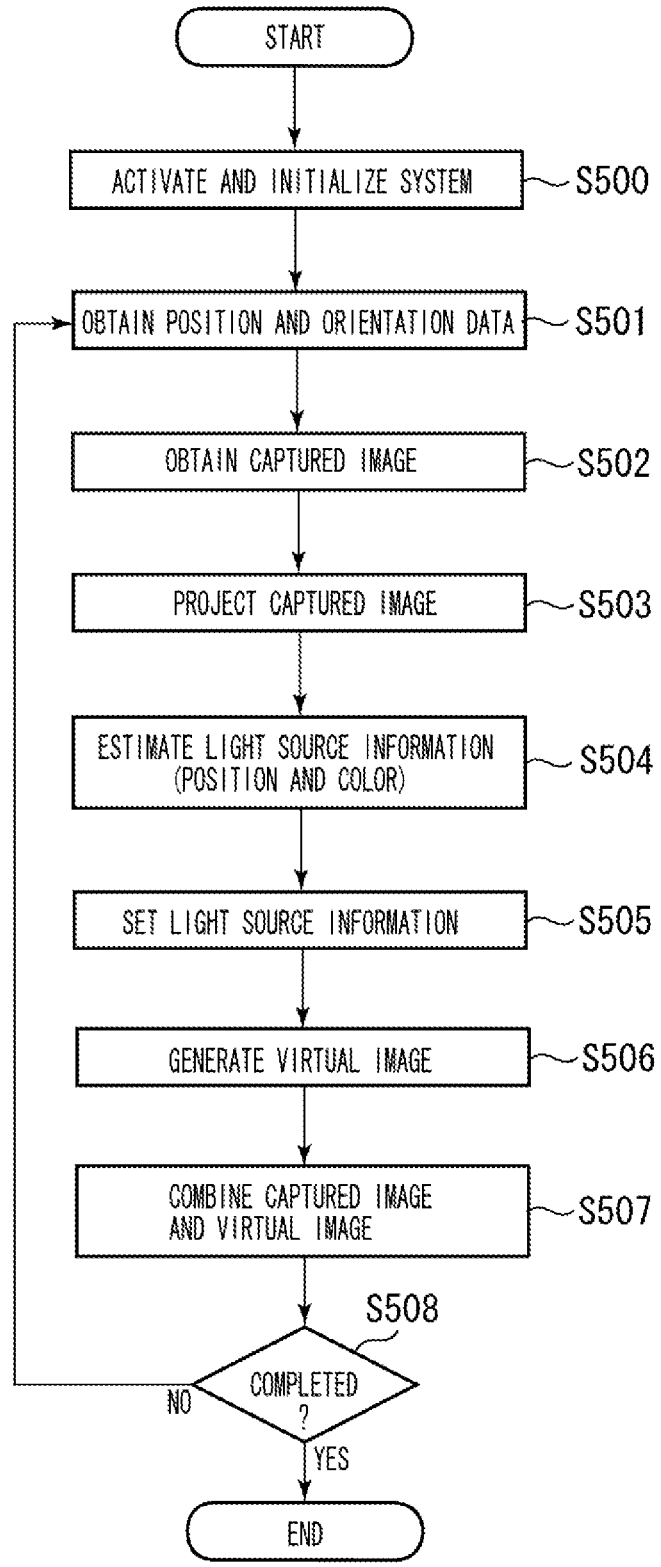
FIG. 5 is a flowchart illustrating exemplary processing performed by the information processing apparatus according to the first exemplary embodiment.

The processing of the entire system according to the present exemplary embodiment is similar to the processing of the entire system according to the first exemplary embodiment, although the processing of the entire system according to the present exemplary embodiment does not include the processing of step S503 (i.e., the processing of projecting a captured image) illustrated in FIG. 5.

More specifically, the present exemplary embodiment directly estimates light source information from a real image captured by the image input unit and sets the estimated information in a virtual space, without generating a celestial sphere image from the image captured from the real environment.

The light source information estimating unit 601 estimates the light source information in the following manner. As described in the first exemplary embodiment, the light source information estimating unit 601 can select an appropriate light source information estimation method from various methods.

A simple method, for example, includes extracting a highlight region from a captured image, detecting a point having a highest luminance value in the highlight region or a centroid point of the highlight region, presuming that a light source is present in a direction connecting the detected point and the viewpoint position, and disposing a point light source at a predicted portion on the celestial sphere 206.

Furthermore, in a case where a model for preliminarily determining the shape and layout of walls and objects in the real space is available, the method includes disposing a light source on the modeling shape of the real environment. The light source information managing unit 602 can manage the layout information.

Similar to the first exemplary embodiment, the present exemplary embodiment can realize a real-time estimation of a light source based on the captured images successively obtained by the image input unit 102. The light source estimation in the present embodiment does not require the generation of a complete celestial sphere image based on a plurality of captured images of the real space before the estimation can commence, and can therefore reduce the time taken to estimate the light source information and the processing burden.

As described above, the image processing apparatus according to the present exemplary embodiment estimates and integrates light source information of the real environment based on the image captured by the video camera 112 of the HMD 101, and can set (or change) the estimated and integrated light source information in the virtual space database 108.

Furthermore, as illustrated in FIG. 6, the image processing apparatus according to the present exemplary embodiment provides a simple arrangement for estimating a light source because the present exemplary embodiment does not require the real environment image database managing unit 105 (i.e., does not require an arrangement for managing a celestial sphere image).

Third Exemplary Embodiment

An information processing apparatus according to the third exemplary embodiment enables a plurality of users to experience the mixed reality provided by the system.

Figure 7:
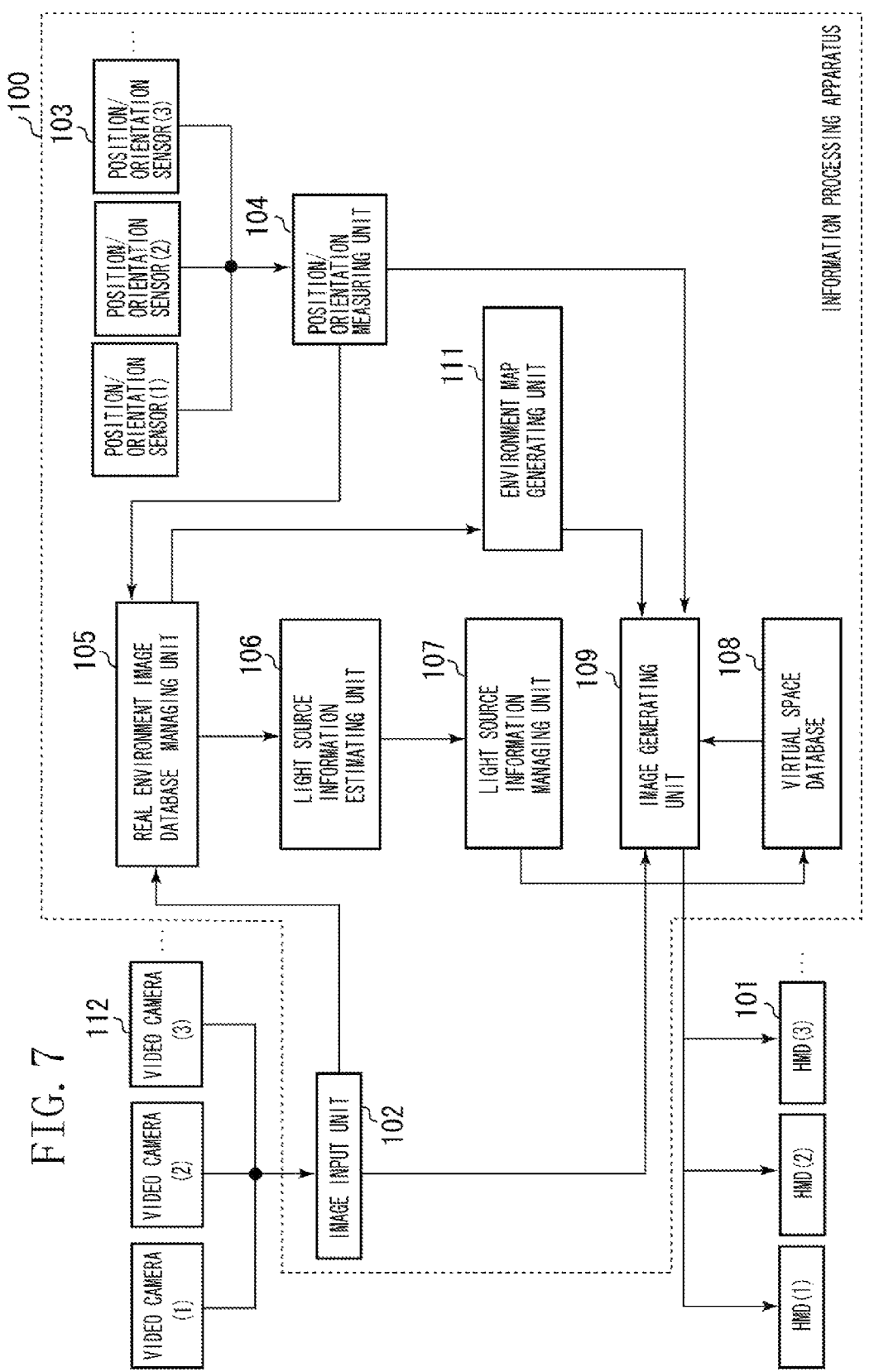
FIG. 7 is a block diagram illustrating an information processing apparatus according to a third exemplary embodiment.

FIG. 7 illustrates an exemplary information processing apparatus according to the present exemplary embodiment. As illustrated in FIG. 7, the information processing apparatus according to the third exemplary embodiment includes a plurality of video cameras 112, a plurality of position/orientation sensors 103, and a plurality of HMDs 101. The rest of the arrangement is similar to the arrangement illustrated in FIG. 1.

The position/orientation sensor 103($i$) detects a position and orientation of the video camera 101($i$). The HMD 101($i$) displays a virtual image based on an image captured by the video camera 112($i$), where i=1, 2, or 3.

The image input unit 102 receives real images captured by the plurality of video cameras 112 and sends the obtained image data to the real environment image database managing unit 105. The position/orientation measuring unit 104 receives three-dimensional position and orientation data of the plurality of the video cameras 112 from the plurality of the position/orientation sensor 103 and sends the obtained data to the real environment image database managing unit 105.

Similar to the first exemplary embodiment, the real environment image database managing unit 105 generates a celestial sphere image based on the plurality of image data and the three-dimensional position and orientation data of the plurality of video camera 112. The light source information estimating unit 106 estimates a light source based on the generated celestial sphere image.

The processing of the entire system according to the present exemplary embodiment is similar to the processing of the first exemplary embodiment illustrated in FIG. 5. However, the processing according to the present exemplary embodiment includes inputting a plurality of captured images, generating a celestial sphere image from the plurality of captured images, and independently generating a combined image for each of a plurality of users.

The image processing apparatus according to the present exemplary embodiment simultaneously inputs and processes a plurality of images captured by a plurality of video cameras 112. Thus, the present exemplary embodiment can improve the accuracy for estimating the light source information and can generate a celestial sphere image resembling the real environment.

Furthermore, the present exemplary embodiment enables a plurality of users to use the same light source information managed by the light source information managing unit 107. The above-described arrangement of the present exemplary embodiment can be applied to the second exemplary embodiment which does not include the real environment image database managing unit 105.

Fourth Exemplary Embodiment

The fourth exemplary embodiment can effectively change the light source information of the virtual environment when illumination conditions of the real environment are dynamically changed while the user is experiencing the MR in the first exemplary embodiment.

The fourth exemplary embodiment is different from the first exemplary embodiment in the processing of step S505 illustrated in FIG. 5. In the present exemplary embodiment, the light source environment estimating unit 106 changes the light source information of step S505 in steps of a predetermined change amount step size, when a luminance value or a color value of the light source information has greatly changed (i.e., has changed by more than some threshold, as determined by threshold processing).

When the processing of step S505 is repeated via the processing of step S508, the light source environment estimating unit 106 continuously changes the light source information in steps of the change amount step size until a luminance value or a color value of the light source information reaches the estimated value.

In the present exemplary embodiment, the change amount step size is chosen having regard to a change amount of a luminance value or a color value of the light source which appears natural to a user. By performing the above-described processing, a virtual image including a light source gradually changing according to the elapse of time can be displayed. Thus, the light source does not change abruptly.

Fifth Exemplary Embodiment

The fifth exemplary embodiment modifies the first exemplary embodiment so that a limited number of light sources are appropriately disposed in a virtual space. A general method for expressing a line (or a surface) light source according to an off-line rendering technique includes disposing point light sources on the line (or surface) light source, and using the point light sources to simulate the line (or surface) light source.

However, the real-time CG rendering system cannot dispose an infinite number of light sources in a virtual space and accordingly uses a limited number of light sources.

To this end, if any line (or surface) light source is present, the real environment image database managing unit 105 of an information processing apparatus according to the fifth exemplary embodiment disposes point light sources on feature points (e.g., edge points or a centroid) of a line (or surface) light source region whose luminance value is higher than a predetermined value (i.e., highlight region).

In this case, the number of light sources usable in the scene is limited. Therefore, simply disposing the point light sources on feature points of a line (or surface) light source cannot realize an effective layout of the light sources.

Therefore, the real environment image database managing unit 105 first calculates a total number of highlight regions in the entire scene and then obtains candidate regions where the light sources can be disposed.

More specifically, to determine the candidate regions, the real environment image database managing unit 105 calculates a contribution value of each highlight region with reference to an area and a luminance value and calculates the priority (i.e., a weighting factor) depending on the calculated contribution value.

For example, the real environment image database managing unit 105 can obtain the contribution value by multiplying a luminance value with a ratio of a highlight region of a light source to the omni-directional real environment. The real environment image database managing unit 105 disposes each virtual light source having a luminance value which is weighted according to the calculated priority of the candidate region.

Furthermore, if a greater number of light sources can be disposed, the number of virtual light sources to be disposed can be increased by weighting light sources having higher priorities in the environment. In this case, virtual light sources can be disposed on the feature points, e.g., edge points or a centroid (or a midpoint), of a surface light source or a line light source or can be disposed as Voronoi domains using light sources disposed as a surface light source or a line light source.

As described above, the information processing apparatus according to the fifth exemplary embodiment can calculate the priority (i.e., weighting factor) based on the real light source information obtained from the real environment image database managing unit 105, and can effectively dispose each virtual light source based on the calculated priority.

The system arrangement according to the fifth exemplary embodiment is described with reference to the block diagram illustrated in FIG. 1. An information processing apparatus according to the fifth exemplary embodiment includes the image input unit 102 which can input images of the real environment that a user can observe.

The real environment image database managing unit 105 stores real images required for estimating light sources in a real environment, when a user looks around. The light source information estimating unit 106 estimates light source information. In this case, the light source information estimating unit 106 calculates an area and a luminance value of each highlight region in the real environment image database managing unit 105.

The light source information estimating unit 106 allocates the priority to each light source of the real environment with reference to the calculated area and the luminance value. Regarding a virtual light source disposed in the scene, the light source information managing unit 107 determines a luminance value for each light source disposed in the virtual space according to the calculated priority.

Finally, based on the estimation result of the light source environment, virtual light source information is registered in the virtual space database 108. As described above, the present exemplary embodiment can appropriately dispose a limited number of light sources in a virtual space.

Software program code for realizing the functions of the above-described exemplary embodiments can be supplied to a system or an apparatus including various devices. A computer (or CPU or micro-processing unit (MPU) or other processor such as a digital signal processor (DSP)) in the system or the apparatus can execute the program to operate the devices to realize the functions of the above-described exemplary embodiments. Accordingly, the present invention encompasses the program code installable in a computer/processor) when the functions or processes of the exemplary embodiments can be realized by the computer/processor.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R)

The method for supplying the program includes accessing a network such as the Internet and downloading the program using the network. For example, a user may access a web site on the Internet using the browsing function of a client computer, when the web site allows each user to download the computer program of the present invention, or compressed files of the programs having automatic installing functions, to a hard disk or other recording medium of the user.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

As described above, one embodiment of the present invention can provide a method for combining a real space image 205 with a virtual image including: inputting an image of a real space captured by an imaging unit 112 (step S502); generating an image covering a predetermined space based on a plurality of real images in the real space inputted in the inputting step (step S503); extracting position information of a light source based on the generated image (step S504); and adding a light source or a shadow on the virtual image based on the extracted position information of the light source (step S505, step S506)

The method of this embodiment may further include: measuring the position and orientation of the imaging unit (step S501); and generating an image covering the predetermined space based on the measured position and orientation (step S503).

The method of this embodiment may further include: generating a virtual image based on the measured position and orientation (step S506); and adding a shadow to the generated virtual image (step S505, step S506).

Another embodiment of the present invention can provide a method for generating a combined image of a real space image (step 205) and a virtual image, including: obtaining an image of a real space captured by an imaging apparatus (step S502); obtaining position and orientation information of the imaging apparatus (step S501); calculating light source information of the real space based on the captured image and the position and orientation information (step S504); updating light source information stored in a storage unit based on the calculated light source information (step S505); and generating a virtual image based on the stored light source information and the position and orientation information (step S506).

In this embodiment the position and orientation information of the imaging apparatus can be obtained from a position/orientation sensor connected with the imaging apparatus. This avoids the requirement to use special apparatus such as a three-dimensional marker including a mirror ball to obtain the position and orientation information.

In this embodiment the method may further include adding the calculated light source information to the stored light source information (step S505).

In this embodiment the method may further include generating a virtual image reflecting a light source indicated by the stored light source information based on the stored light source information and the position and orientation information (step S506).

In this embodiment the method may further include: obtaining images of the real space captured by a plurality of imaging units (step S502); estimating light source information based on the captured images (step S502); updating the stored light source information based on the estimated light source information (step S505); and generating virtual images corresponding to the position and orientation information of the plurality of imaging units based on the updated light source information (step S506).

In this embodiment the method may further include: obtaining geometric information of the real space; and generating the light source information based on the captured image, the position and orientation information, and the geometric information (step S504).

In this embodiment the method may further include: generate updated light source information based on the stored light source information and the calculated light source information; and updating the stored light source information based on the generated updated light source information (step S505).

In this embodiment the method may further include: generating the updated light source information by applying weighted calculations to the stored light source information and the calculated light source information (step S505).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-204845 filed Jul. 27, 2006, which is hereby incorporated by reference herein in its entirety.

What is claimed is:

1. A method of presenting a combined image in which a real space image of a real space is combined with a virtual image of a virtual object on a head-mounted display device for a user, the method comprising:
 a receiving step of receiving image data for a plurality of captured images captured by an imaging apparatus carried by the user, the plurality of captured images including images relating to different parts of the real space;
 a position/orientation obtaining step of obtaining position and orientation information of the imaging apparatus;
 a first generating step of generating modeling image data based on the received image data for the plurality of captured images and on the obtained position and orientation information of the imaging apparatus, the modeling image data representing an image covering at least a predetermined portion of the real space;
 an estimating step of estimating light source information relating to the real space based on the modeling image data;
 a setting step of setting light source information relating to the virtual object based on the estimated light source information relating to the real space;
 a second generating step of generating, using a processor, the virtual image based on the set light source information relating to the virtual object;
 a combining step of combining, using the processor, the virtual image with the real space image; and
 a displaying step of displaying, on the head-mounted display device, the combined image in which the real space image is combined with the virtual image,
 wherein the receiving step, the position/orientation obtaining step, the first generating step, the estimating step, the setting step, the second generating step, the combining step, and the displaying step are repeatedly performed in real-time.

2. The method according to claim 1, further comprising generating combined image data representing the combined image, the combined image data being generated by combining virtual image data representing the virtual image and real space image data representing an image of a desired part of the real space.

3. The method according to claim 1, wherein the modeling image data represents the plurality of captured images as projected onto a model having a predetermined modeling shape to model a predetermined portion of the real space.

4. The method according to claim 1, further comprising:
 obtaining position and orientation data representing positions and orientations of the imaging apparatus when the plurality of images are being captured; and
 employing the obtained position and orientation data together with the received image data for the plurality of captured images to generate the modeling image data.

5. The method according to claim 1, wherein part or all of the position and orientation information is obtained by a position/orientation sensor connected with the imaging apparatus carried by the user.

6. The method according to claim 1, wherein part or all of the position and orientation information is obtained by arranging a marker, having predetermined features, at a reference position in the real space and processing the received image data for the plurality of captured images to search for a region in a captured image having features corresponding to the predetermined features of the marker.

7. The method according to claim 1, wherein the plurality of captured images are captured by a corresponding plurality of imaging apparatuses which are carried by a corresponding plurality of users; and
 wherein, for each user, generating combined image data representing a combined image for the user concerned, the light source information relating to the virtual object being used in common for generating the combined image data for all of the plurality of users.

8. The method according to claim 1, wherein, in the step of estimating the light source information, a change in the estimated light source information is effected gradually each time the estimating step is repeatedly performed in real-time.

9. The method according to claim 1, wherein the light source information relating to the virtual object includes information corresponding to a limited number of virtual light sources, and the light source information relating to the real space includes a plurality of highlight regions in the real space, and
 wherein the method further comprises:
 assigning a priority to each of the plurality of highlight regions in the real space; and
 employing the assigned priorities and positions of the highlight regions to set the light source information for each of the limited number of virtual light sources.

10. A non-transitory computer-readable storage medium that stores a computer program which, when executed on a computer or processor, causes the computer or processor to carry out the method of claim 1.

11. An apparatus for presenting a combined image in which a real space image of a real space is combined with a virtual image of a virtual object on a head-mounted display for a user, the apparatus comprising:
 a receiving unit which receives image data for a plurality of captured images captured by an imaging apparatus carried by the user, the plurality of captured images including images relating to different parts of the real space;
 a position/orientation obtaining unit which obtains position and orientation information of the imaging apparatus;
 a modeling image data generating unit which generates modeling image data based on the received image data for the plurality of captured images and on the obtained position and orientation information of the imaging apparatus, the modeling image data representing an image covering at least a predetermined portion of the real space;
 a light source information estimating unit which estimates light source information relating to the real space based on the modeling image data;
 a light source information setting unit which sets light source information relating to the virtual object based on the estimated light source information relating to the real space;

a virtual image generating unit which generates the virtual image based on the set light source information relating to the virtual object; and a processor which combines the virtual image with the real space image, and displays, on the head-mounted display device for the user, the combined image in which the real space image is combined with the virtual image, wherein the receiving unit receives the image data, the position/orientation obtaining unit obtains the position and orientation information of the imaging apparatus, the modeling image data generating unit generates modeling image data, the light source information estimating unit estimates the light source information, the light source information setting unit sets the light source information relating to the virtual object, the virtual image generating unit generates the virtual image and the processor combines the virtual image with the real space image and displays the combined image repeatedly in real-time.

12. A method for combining a real space image with a virtual image on a head-mounted display device for a user, comprising:

an input step of inputting an image of a real space captured by an imaging unit carried by the user;

a position/orientation obtaining step of obtaining position and orientation information of the imaging unit;

a generating step of generating an image covering a predetermined portion of the real space based on a plurality of captured images of the real space captured by the imaging unit and on the position and orientation information of the imaging unit obtained at the obtaining step;

an estimating step of estimating position information of a light source relating to the real space based on the generated image;

a setting step of setting position information of the light source relating to the virtual image based on the estimated position information of the light source relating to the real space;

an adding step of adding a light source or a shadow on the virtual image based on the position information of the light source set by the setting step;

a combining step of combining, using a processor, the virtual image with the real space image; and a displaying step of displaying the combined image generated by combining the real space image with the virtual image to which the light source or the shadow has been added on the head-mounted display device for the user, wherein the input step, the position/orientation obtaining step, the generating step, the estimating step, the setting step, the adding step, the combining step and the displaying step are repeatedly performed in real-time.

13. The method according to claim 12, wherein the position/orientation obtaining step includes measuring the position and orientation of the imaging apparatus.

14. The method according to claim 13, further comprising:
generating the virtual image based on the measured position and orientation of the imaging unit; and
adding a shadow to the generated virtual image.

15. A non-transitory computer-readable storage medium that stores a program for instructing a computer to implement the image processing method according to claim 12.

16. A method for generating a combined image of a real space image and a virtual image and displaying the combined image on a head-mounted display device for a user, the method comprising:

an image obtaining step of obtaining a captured image of a real space captured by an imaging apparatus carried by the user;

a position/orientation obtaining step of obtaining position and orientation information of the imaging apparatus;

a calculating step of calculating light source information of the real space based on the captured image of the real space captured by the imaging apparatus and on the position and orientation information of the imaging apparatus obtained in the position/orientation obtaining step;

an updating step of updating light source information stored in a storage unit based on the light source information of the real space calculated in the calculating step;

a generating step of generating, using a processor, the virtual image based on the updated light source information and on the position and orientation information of the imaging apparatus;

a combining step of combining, using the processor, the virtual image with the real space image; and a displaying step of displaying, using the processor, the combined image of the real space image combined with the virtual image on the head-mounted display device for the user, wherein the image obtaining step, the position/orientation obtaining step, the calculating step, the updating step, the generating step, the combining step and the displaying step are repeatedly performed in real-time.

17. The method according to claim 16, wherein the calculating step includes adding the calculated light source information to light source information stored in a storage unit.

18. The method according to claim 17, wherein the generating step includes generating the virtual image reflecting a light source indicated by the stored light source information based on the stored light source information and the position and orientation information.

19. The method according to claim 17, further comprising:
obtaining additional images of the real space captured by a plurality of imaging units;
updating the stored light source information based on the estimated light source information; and
generating virtual images corresponding to the position and orientation information of the plurality of imaging units based on the updated light source information.

20. The method according to claim 16, further comprising:
obtaining geometric information of the real space; and
generating the light source information based on the captured image, the position and orientation information, and the geometric information.

21. A non-transitory computer-readable storage medium that stores a program for instructing a computer to implement the image processing method according to claim 16.

22. An apparatus for combining a real space image with a virtual image on a head-mounted display device for a user, comprising:

an input unit which inputs an image of a real space captured by an imaging unit carried by the user;

a position/orientation obtaining unit which obtains position and orientation information of the imaging unit;

a generating unit which generates an image covering a predetermined portion of the real space based on a plurality of real images in the captured real space input by the input unit and on the obtained position and orientation information of the imaging unit;

an estimating unit which estimates position information of a light source relating to the real space based on the generated image;

a light source information setting unit which sets light source information relating to the virtual object based on the estimated position information of the light source relating to the real space;

an adding unit which adds a light source or a shadow to the virtual image based on the set light source information relating to the virtual object; and a processor which combines the virtual image with the real space image, and displays the combined image generated by combining the real space image with the virtual image to which the light source or the shadow has been added on the head-mounted display device for the user, wherein the input unit inputs the image of the real space, the position/orientation obtaining unit obtains the position and orientation information of the imaging apparatus, the generating unit generates the image covering the predetermined space, the estimating unit estimates the light source information, the light source information setting unit sets the light source information relating to the virtual object, the adding unit adds the light source or the shadow to the virtual image, and the processor combines the virtual image with the real space image and displays the combined image repeatedly in real-time.

23. An apparatus for generating a combined image of a real space image and a virtual image and displaying the combined image on a head-mounted display device for a user, the apparatus comprising:

an image obtaining unit which obtains a captured image of a real space captured by an imaging apparatus carried by the user;

a position/orientation obtaining unit which obtains position and orientation information of the imaging apparatus;

a calculating unit which calculates light source information of the real space based on the captured image and the position and orientation information of the imaging apparatus;

a light source information updating unit which updates light source information stored in a storage unit based on the calculated light source information of the real space; and a processor which generates a virtual image based on the updated light source information and the position and orientation information of the imaging apparatus, which combines the virtual image with the real space image, and which displays the combined image of the real space image combined with the virtual image on the head-mounted display device for the user, wherein the image obtaining unit obtains the image of the real space, the position/orientation obtaining unit obtains the position and orientation information of the imaging apparatus, the calculating unit calculates the light source information, the light source information updating unit updates the light source information stored in the storage unit, and the processor generates the virtual image, combines the virtual image with the real space image and displays the combined image repeatedly in real-time.

* * * * *